(No Model.)
J. R. KUNZELMAN.
VEHICLE RUNNING GEAR.
No. 471,007. Patented Mar. 15, 1892.
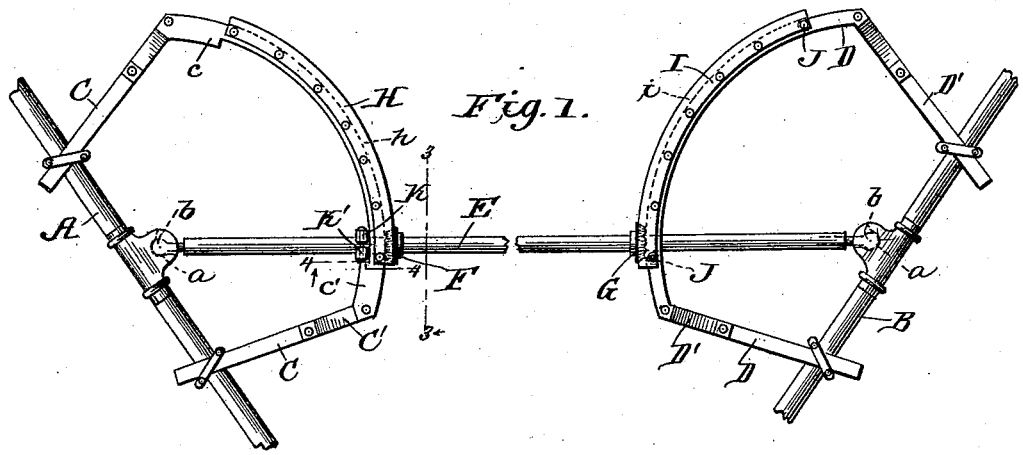
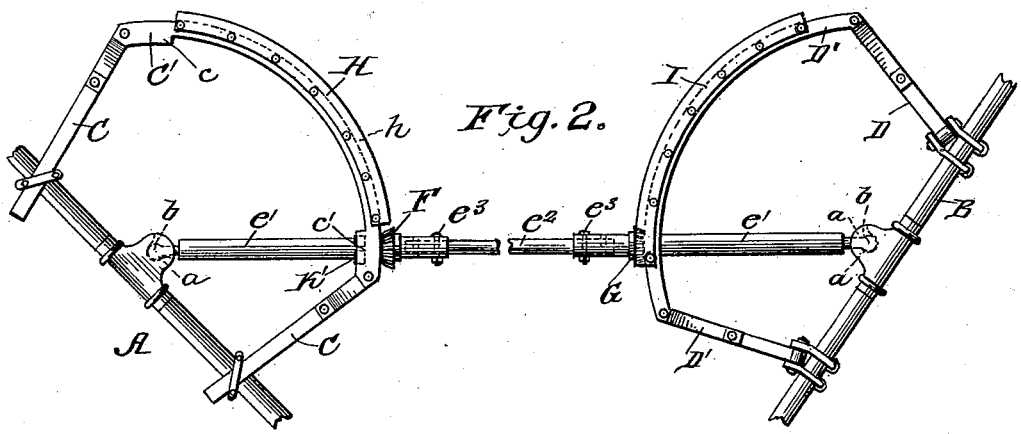
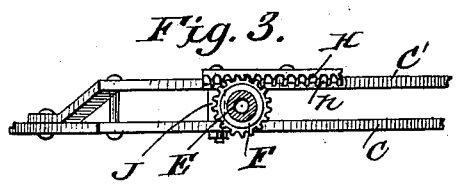
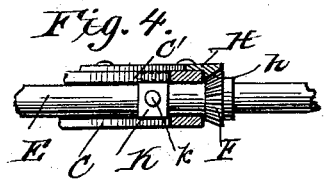
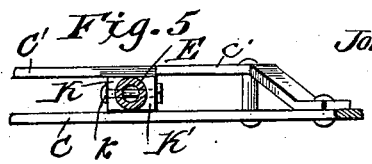
WITNESSES:
Fred G. Dieterich
W. D. Blondel
INVENTOR:
John R. Kunzelman
BY Munn & Co.
ATTORNEYS.

UNITED STATES PATENT OFFICE.

JOHN R. KUNZELMAN, OF STILLWATER, MINNESOTA.

VEHICLE RUNNING-GEAR.

SPECIFICATION forming part of Letters Patent No. 471,007, dated March 15, 1892.

Application filed August 12, 1891. Serial No. 402,480. (No model.)

*To all whom it may concern:*

Be it known that I, JOHN R. KUNZELMAN, residing at Stillwater, in the county of Washington and State of Minnesota, have invented certain new and useful Improvements in Running-Gears, of which the following is a specification.

My invention relates to that class of running-gear for wagons, bob-sleds, &c., in which the reach is adapted to rotate, it being for that purpose connected with the axles by universal joints.

It is more particularly an improvement upon the running-gear for which I have received Letters Patent in the United States, numbered 430,131. In that case the reach is connected with each hound or sway-bar by means of a cord, so that the former is rotated when the front axle assumes any other than a right angle to it, and the rear axle is thereby moved to a corresponding angle, but in the opposite direction.

In the present invention I employ racks and pinions as the means of connection between the reach and axle-hounds, suitably-arranged stops being provided for arresting the rotation of the reach to limit the angle which the rear axle may assume to the reach, while permitting the front axle to assume a greater one, as required to facilitate turning of sharp corners.

To these ends my invention consists in the novel arrangement and combination of parts, such as will hereinafter be fully described in the annexed specification, and particularly pointed out in the claims, reference being had to the accompanying drawings, in which—

Figure 1 is a top plan view of my improved running-gear, the reach being shown formed of a single member. Fig. 2 is a similar view, the reach being shown in sections and the front axle being turned at a greater angle to the reach than the rear axle. Fig. 3 is a transverse section on the line 3 3, Fig. 1. Fig. 4 is a longitudinal section on the line 4 4, Fig. 1; and Fig. 5 is a cross-section of the reach and the stops hereinafter referred to.

In the accompanying drawings, A indicates the front axle, and B the rear axle, such axles being similar in form and construction and provided each with hounds or sway-bars C C' D D', such bars being arranged double, as shown in Fig. 3, and between which the reach E passes, the ends of such reach being formed with balls $b$, which seat in the sockets $a$, secured to the axles A and B in a manner clearly shown in Fig. 1 of the drawings.

When it is desired to adapt my improved running-gear for hook-and-ladder trucks and such like vehicles, the reach E is formed of a single member, as shown in Fig. 1; but the preferred construction is shown in Fig. 2, which shows the reach formed in three parts, the end portions $e'$ being hollow to receive the central or solid member $e^2$, so that the reach is adapted to telescope, as required to lengthen or shorten the reach, which is a desideratum in a certain class of farm-wagons. Screw-bolts $e^3$ are employed to secure the parts $e'$ $e^2$ together for any adjustment, as shown. The reach E is provided with beveled pinions F and G, which are keyed or otherwise fastened to the reach, which are arranged to respectively engage the curved racks H and I, secured, respectively, to the upper one of the front and rear sway-bars, their rack-faces $h$ and $i$ projecting inward beyond such bars, as clearly shown in Fig. 4. By this construction it will be observed that when the front axle is turned in either direction the rack I will engage the pinion F and rotate the reach, and thereby through the medium of the pinion G and rack I swing the rear axle to the same angle to the reach as the front axle, but in an opposite direction, (see Fig. 1,) stops J J being provided on the rear hounds, which limit the movement of the said hounds on the reach. As before stated, the front axle is arranged for a greater movement than the rear axle— *i. e.*, after the rear axle has been turned to its limit the front axle can be still further turned. To this end the front edge of the upper member C' of the front sway-bars is projected, as at $c$ $c'$, such projections beginning at the points where the rack-bar H ends.

K K' indicate stops, (the construction of which is most clearly shown in Fig. 5,) which are secured to the reach E by the bolt $k$, as shown.

By reference to Fig. 1 it will be observed that the front and rear hounds are turned to a point where the rear hound is at its limit, at which time the pinion F will be just under the extreme end of the rack H and the stop K' just about to pass under the projection c'. Now should the front axle and hounds be swung still farther in the direction indicated by the arrow the rack H will leave the pinion F and the projection c' pass over the stops K' and K and thereby hold the reach from turning during this latter movement of the front axle. Now when the parts are in the position shown in Fig. 2 it will be readily seen that when the front axle is turned in the reverse direction it has a free movement in advance of the rear axle, which movement permits the projection c' to clear the stops K K' and the pinion F engage the rack H, after which the front and rear axles will act in unison.

To provide for an oscillatory movement of the axles independent of the hounds, I may employ a hinged connection between such hounds and axle, as shown in Fig. 2.

Having thus described my invention, what I claim, and desire to secure by Letters Patent, is—

1. In a running-gear for vehicles, the combination of the reach having pinions and stops, as described, with the front and rear axles, to which is connected by a universal joint the front and rear hounds or sway-bars, the rack-bars attached thereto, the front hound having projections with which the said stops engage, substantially as and for the purposes specified.

2. The combination, with the front and rear axles, the hounds and the reach having universal-joint connections with the axles, and the rack and gear devices connecting said reach and hounds and arranged whereby the movement of the front axle will be transmitted in an opposite direction to the rear axle and whereby the front axle will be adapted for a greater movement than the rear axle, as and for the purpose described.

3. In a running-gear for vehicles, the combination of the reach having pinions and stops, as desired, with the front and rear axles, to which it is connected by a universal joint, the front and rear hounds, and rack-bars attached thereto, the front hound having shoulders with which the said stops are adapted to engage and the front rack being made of less length than the rear one, as and for the purpose specified.

4. The combination, with the axles, rotating reach, and racks and pinions, of the hounds hinged to said axles, as shown and described.

JOHN R. KUNZELMAN.

Witnesses:
LOUIS L. MANWARING,
F. V. COMFORT.